Oct. 11, 1949.                    C. W. HANSEL                    2,484,505
              OPTICAL PROJECTION APPARATUS FOR DAYLIGHT
                     PROJECTION AND DEMONSTRATION
Filed July 2, 1946                                    2 Sheets-Sheet 1

Inventor
Carl William Hansel.

Oct. 11, 1949.    C. W. HANSEL    2,484,505
OPTICAL PROJECTION APPARATUS FOR DAYLIGHT
PROJECTION AND DEMONSTRATION
Filed July 2, 1946    2 Sheets-Sheet 2

Inventor
Carl William Hansel

Patented Oct. 11, 1949

2,484,505

UNITED STATES PATENT OFFICE 2,484,505

OPTICAL PROJECTION APPARATUS FOR DAYLIGHT PROJECTION AND DEMONSTRATION

Carl William Hansel, Bedford, England

Application July 2, 1946, Serial No. 680,919
In Great Britain April 12, 1946

2 Claims. (Cl. 88—24)

The present invention provides an apparatus for carrying out all forms of optical projection and demonstration in daylight. For daylight projection, the optical image must be protected from stray illumination. The object of the invention is to provide a convenient means for preventing stray light from falling on the optical image, by the use of light shields, preferably on all sides of the image, the optical image being viewed indirectly in a mirror, which may be positioned so that it also acts as a light shield. The light shields are so positioned, constructed and dimensioned as not to interfere unduly with the field of view in the mirror. The viewing mirror must be positioned so as to leave sufficient space between the mirror and screen for some of the light shields, and must be sufficiently large to provide the angular field of view required. The viewing mirror is positioned so that it shields the screen image from as much stray light as possible. The distance of the mirror from the screen may be adjustable, and, for preference, it should be sufficient to produce a reflected image at a height and distance from the spectators so that they do not obstruct each other's view. This economises space and provides more comfortable viewing for those near the viewing mirror. For a large audience a large mirror is required.

Some examples of construction are now given, but the invention is not restricted to the forms or dimensions of the apparatus described and illustrated in the accompanying drawings.

Figure 1:
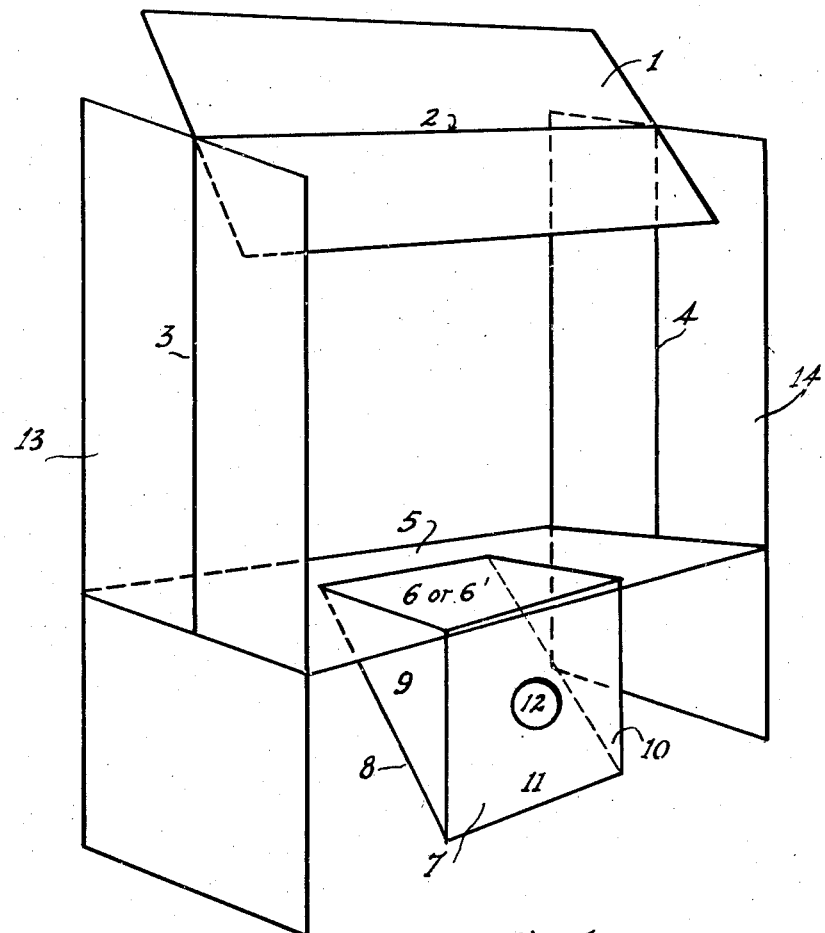
Figure 1 is a schematic perspective view illustrating generally the structural organization of my invention.

Fig. 1 indicates one form of apparatus suitable for daylight projection in a classroom. 1 is a large mirror, supported axially by a rod or tube 2 about which the mirror may rotate so as to be inclined at any desired angle. The axial support of the mirror rotates in bearings carried by supports 3 and 4. The axis of the mirror may be about 7 feet from the floor so that the mirror is supported well above a table or stage 5 having a translucent panel 6 at its centre which may be used as a screen as well as a stage or support for objects. The table or stage may be attached to the supports for the mirror or independently mounted.

Alternatively, the light beam from a projector may be deviated upwards by the auxiliary mirror 8 on to a translucent screen 6 provided with a viewing mirror 1 above it. Another alternative is to use a horizontal translucent screen above a viewing mirror inclined at 45 degrees with the screen or nearly so. Light projected vertically downwards forms an image on the screen which is seen in the viewing mirror. Or, again, light projected horizontally into an auxiliary deviation mirror above the translucent screen may deflect the light vertically downwards, and produce an image on a horizontal screen which is seen in a vertical plane in the viewing mirror. In the examples given a horizontal screen has been used. In use the invention is applicable to a screen in any position.

Figure 1A:
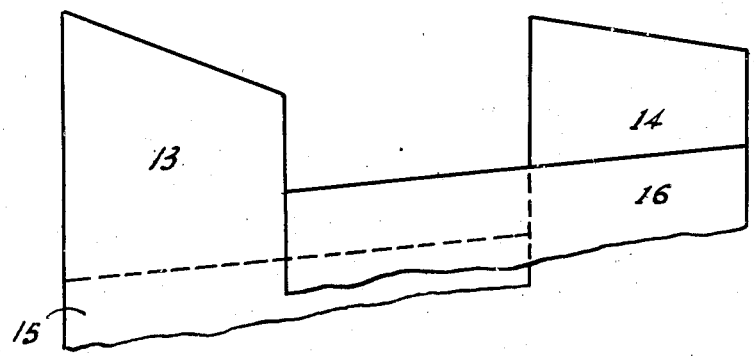
Figure 1a is a fragmentary perspective view illustrating contemplated use of light shielding construction.

Below the centre panel or screen 6 is a substage unit 7 which is a light shielded substage deviation mirror, consisting of a plane deviation mirror 8 inclined at 45 degrees with the stage 6 and light shields 9, 10, 11 having an inner surface of dull black or nonreflecting material. The light shield 11 has an opening 12 to allow the entrance of a light beam producing an image on screen 6 or a substituted screen after deviation by mirror 8. The aperture 12 may accommodate or be associated with a lens or other optical element used to cooperate in the formation of an image on screen 6 or in its modification. Any type of semitransparent screen may be substituted for 6, for example, a fluorescent screen such as uranium glass or a screen coated with fluorescent material. Alternatively, curtains may be used for any of the light shields 9, 10, 11 or 13, 14, 15, 16 (Fig. 1a). These are easily drawn aside or removed to provide for the use of the apparatus for demonstration purposes.

The light shields 13 and 14 at the sides of screen 6, and 15 and 16 at the front and back, may be made of any suitable opaque material and their inner surfaces should be nonreflecting, for example, dull black. They should extend from the stage to the mirror so as to completely exclude the light except that a viewing opening must be provided in 15 of sufficient size to enable the image in the mirror to be seen over a wide angular field of view. The light shields 13, 14, 15, 16 should be positioned not too near the screen 6 to prevent them from obstructing the field of view. The light shields above and below the stage may consist of folded hinged opaque panels which can easily be assembled in position or removed if not required.

Figure 2:
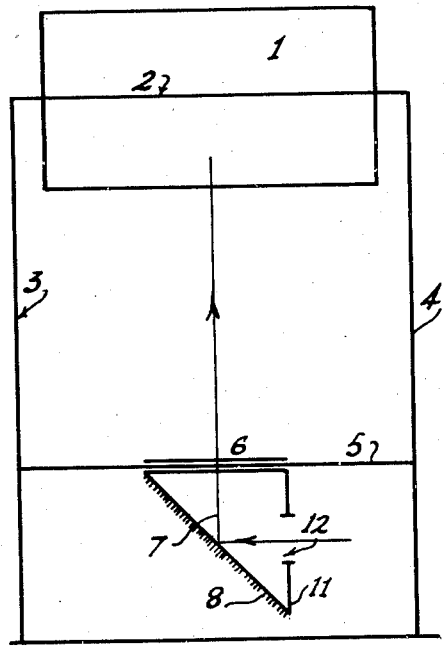
Figure 2 is a schematic front elevation of my apparatus.
Figure 3:
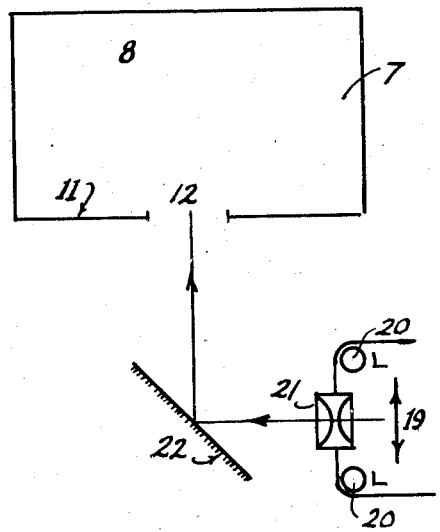
Figure 3 is a schematic plan view showing the use of two mirrors initially to display a lighted object.

For episcopic projection, the substage unit may be rotated horizontally through 90 degrees so that the light beam enters the substage unit 7 from the side as in Fig. 2. Alternatively, in order to avoid the rotation of 7, the projector may be modified so that in association with the substage unit it becomes an episcope. One method of doing this is shown in plan in Fig. 3. An object 19 is brightly illuminated partly by an extended light source and reflector 20 passing round an objective 21 and partly by the light of the room, since, according to the use of the invention, only the screen on which the final image is formed need be shielded from stray light. The light beam leaving the objective 21 is deviated by an auxiliary vertical mirror 22 so that it passes through aperture 12 of the substage unit 7 and is deviated by mirror 8 upwards so as to form an image on the screen 6 or on a fluorescent screen substituted for 6.

For microprojection, the projector is mounted in front of aperture 12. The light beam passes horizontally through 12, is deviated upwards to form an image on screen 6 which is seen in the viewing mirror 1.

For that type of stereoscopic projection in which two separate images are produced side by side, either a larger screen 6 or 6' may be used or two screens side by side with a light shield in between them. The second means is easy of application in an advertising pillar designed for one person to view the image at a time.

Figure 4:
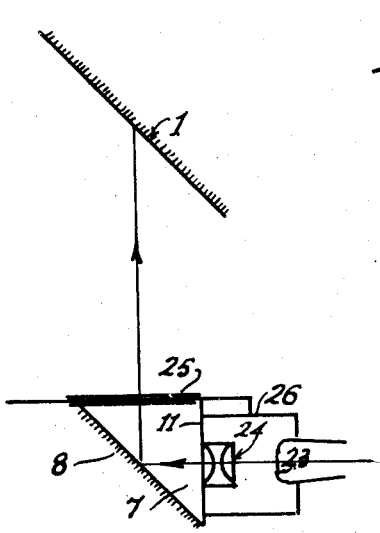
Figure 4 is a schematic elevation illustrating the projection of a magnified object.

The use of the invention is applicable to the enlargement and intensification of images for exhibition in daylight. For example: In Fig. 4, 23 is a small image requiring enlargement such as the image at the end of a cathode ray tube. A lens system 24 in aperture 12 produces an enlarged image of this image on a fluorescent screen 25 substituted for screen 6. The image 23 is protected from stray light by a light shield 26. The enlargement of the image reduces the intensity of the light falling on the fluorescent screen but this may be compensated by the intensity of the image due to fluorescence. The fluorescent screen and the lens system 24 may be made of material highly transparent to the radiation producing fluorescence. The image formed by high power microprojection may be amplified in a similar way and the light source used may be specially chosen to give brilliant fluorescence.

If some particular part of an image requires modification, an optical system maybe used to modify this part. For example: A lens supported at a suitable distance above the image formed on screen 6 may be used as a magnifying glass to produce a real or magnified virtual image of any part of the image on screen 6.

Figure 5:
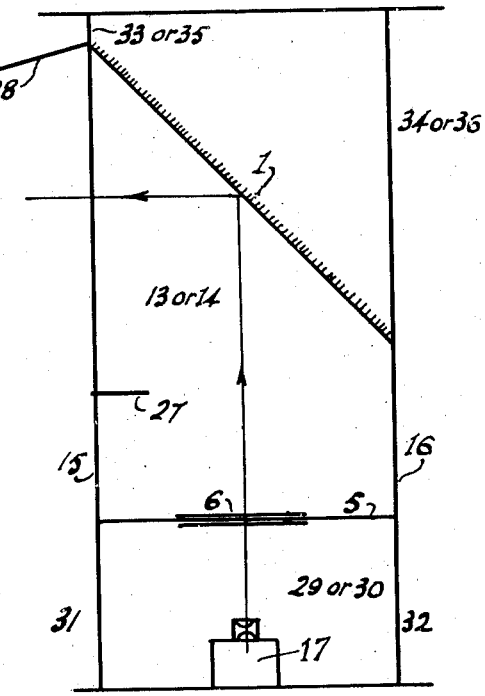
Figure 5 is a schematic elevation disclosing direct projection through a screen to a viewing mirror and also shows additional shields to eliminate undesired light on the viewing mirror.

The system of light shields already described may be varied in many ways but their shape, construction and position is always designed to prevent stray light from falling on the image on the screen 6. The size and position of the light shields is chosen so that they do not interfere with a wide angle of view of the image in the viewing mirror. Fig. 5 shows a projector 17 producing an optical image on screen 6, without the aid of a deviation mirror 8. The optical image on screen 6 is protected from stray illumination by light shields 13, 14, 15, 16, 27, 28, above the screen; and 29, 30 at the sides and 21, 32 front and back below the screen. Fig. 5 also shows a stage and screen supported by the light shields 29, 30, 31, 32, these supports being independent of the mirror supports.

To preserve a wide angular field of view in viewing mirror 1, it should be supported as far back as possible so that the supports do not intefere unduly with the field of view. In Fig. 5, the viewing mirror 1 is supported entirely from the rear so that the supports 33, 34, 35, 36 do not interfere with the field of view in the viewing mirror in any way whatever.

Thus the apparatus may be provided with auxiliary screens and auxiliary mirrors and accessory optical elements interposed in the light beam at any desired points along it so as to produce a complete equipment for every kind of projection and for producing an uninverted image if desired.

The apparatus may be combined with any type of projection apparatus in order to exhibit an optical image in daylight. The projector may be associated functionally with the apparatus by placing its objective in front of or in aperture 12. Alternatively, the substage unit 7 and the projector may be enclosed in the same darkened space by means of the same light shields.

The apparatus may be arranged so that the light from a projector reaches the screen first and then the viewing mirror or the mirror first and then the screen. The first arrangement is desirable for a translucent screen and the second for an opaque screen, but both arrangements are applicable to either type of screen.

I claim:

1. In apparatus for optical projection to a large number of spectators in daylight, comprising an inclosure having therein a stage provided with a central panel, said panel constituting a screen, in combination with a viewing mirror and a projector means, said projector means being located beneath the stage, the major portion of said projector means being housed within the inclosure portion beneath the stage and its screen, said inclosure having therein a sight opening located in front of the viewing mirror, said sight opening having upper and lower substantially horizontal shields, said upper shield extending forwardly and slightly downwardly from the upper edge of the viewing mirror and sight opening, said lower shield extending inwardly from the lower edge of the sight opening.

2. In apparatus for optical projection to a large number of spectators in daylight comprising an enclosure having therein a stage provided with a center panel constituting a screen in combination with a viewing mirror and a projector, said mirror affording a wide angular field of view, said mirror defining a plane at substantially an angle of 45 degrees with the screen, both said screen and said mirror being enclosed on five sides and the sixth side being open and having substantially horizontal upper and lower shields arranged in substantially parallel relation to each other to prevent stray light from reaching the optical image formed on the screen and not to interfere with the field of view relative to the viewing mirror, said upper shield extending outwardly and downwardly from the upper edge of said mirror and defining an obtuse angle with said mirror, said lower shield extending upwardly from the stage and having a short section thereof extending inwardly at substantially a right angle to the upwardly extending portion and terminating on a level intermediate the lower edge of said mirror and said stage.

CARL WILLIAM HANSEL.

REFERENCES CITED

The following references are of record in the file of this patent:

UNITED STATES PATENTS

| Number | Name | Date |
|---|---|---|
| 1,283,590 | Stavenhagen | Nov. 5, 1918 |
| 1,331,081 | Robertson et al. | Feb. 17, 1920 |
| 1,332,413 | Robertson | Mar. 2, 1920 |
| 1,419,281 | Macbeth | June 13, 1922 |
| 1,840,920 | Spaulding | Jan. 12, 1932 |
| 1,994,543 | Stenz et al. | Mar. 10, 1935 |
| 2,133,321 | Ehrlich | Oct. 18, 1938 |
| 2,141,528 | Garrard et al. | Dec. 27, 1938 |
| 2,295,470 | Hansel | Sept. 8, 1942 |